(12) United States Patent
Posokhow et al.

(10) Patent No.: US 7,848,954 B2
(45) Date of Patent: Dec. 7, 2010

(54) ON-LINE MEDIA STORE THAT SUPPORTS PRE-ORDERING OF DIGITAL MEDIA ASSETS

(75) Inventors: Bruno Posokhow, San Francisco, CA (US); Ellis M. Verosub, San Francisco, CA (US); Payam Mirrashidi, San Francisco, CA (US); David Lawrence Neumann, Portland, OR (US); David Scheck, Potomac, MD (US)

(73) Assignee: Apple Inc., Cupertino, CA (US)

( * ) Notice: Subject to any disclaimer, the term of this patent is extended or adjusted under 35 U.S.C. 154(b) by 1299 days.

(21) Appl. No.: 11/212,314

(22) Filed: Aug. 24, 2005

(65) Prior Publication Data

US 2006/0247976 A1 Nov. 2, 2006

Related U.S. Application Data

(60) Provisional application No. 60/675,731, filed on Apr. 27, 2005.

(51) Int. Cl.
*G06Q 30/00* (2006.01)
(52) U.S. Cl. .......................................... 705/26; 705/37
(58) Field of Classification Search .................... 705/26, 705/37
See application file for complete search history.

(56) References Cited

U.S. PATENT DOCUMENTS 5,892,900 A * 4/1999 Ginter et al. .................. 726/26

| | | |
|---|---|---|
| 2004/0149121 A1 | 8/2004 | Ballard |
| 2004/0268451 A1 | 12/2004 | Robbin et al. |
| 2005/0021478 A1 | 1/2005 | Gautier et al. |
| 2005/0050345 A1 | 3/2005 | Dowdy et al. |
| 2006/0248113 A1 | 11/2006 | Leffert et al. |
| 2006/0248114 A1 | 11/2006 | Anderson et al. |
| 2009/0144153 A1 | 6/2009 | Kondrk et al. |

OTHER PUBLICATIONS

"The iTunes Music Store. Downloads Done Right", www.apple.com/music/store, downloaded Sep. 24, 2003, pp. 1-3.
"Shop The First Online 99¢ Store", www.apple.com/music/store/shop.html, downloaded Sep. 24, 2003, pp. 1-2.
"Comcast Officially Kicks Off NFL Network and NFL Network On Demand", Press Release, Sep. 13, 2004, pp. 1-2.
"NFL Sunday Ticket Features", DIRECTV, 2005, www.directvsports.com/subscriptions/nflsundayticket/enhancements, (downloaded Feb. 13, 2006), pp. 1-3.
"NFL Sunday Ticket, Go Everywhere the Action Is!", DIRECTV, 2005, www.directvsports.com/subscriptions/nflsundayticket, (downloaded Feb. 13, 2006), pp. 1-3.

(Continued)

*Primary Examiner*—James Zurita

(57) ABSTRACT

Techniques to facilitate pre-ordering of digital media assets from an on-line media store are disclosed. A user of the on-line media store can view advance listings for digital media assets that have not yet been released. A user can also choose to pre-order a digital media asset that has not yet been released. Such a pre-order is recorded and monitored so that the desired digital media asset can be purchased and delivered to the user once the digital media asset become available. Since the monitoring is computerized and the delivery is electronic, once a digital media asset becomes available, delivery of any pre-order can occur nearly immediately.

20 Claims, 8 Drawing Sheets

OTHER PUBLICATIONS

Shopping Cart with Recommendations, Amazon.com, downloaded Apr. 27, 2005, pp. 1-4.

Book Search Results, Amazon.com, downloaded Apr. 27, 2005, pp. 1-11.

Brilliant—Tm—Digital Entertainment Launches Full Screen Multipath—Tm—Movie Webisodes On the Internet; Commences Retail Cd-Rom Distribution for Holiday Season, Business Editors, Business Wire, New York; Dec. 7, 1998. p. 1, downloaded From Proquest on the Internet on Nov. 11, 2009, 6 pages.

Business Wire, a2b music and Hollywood Records Kick Off Felicity Soundtrack with Joan Jones Download May 7: Entertainment Editors, Business Wire, New York, May 7, 1999, downloaded from ProQuest Direct on the Internet on Mar. 14, 2010, 3 pages.

NPL_02 Billboard, Music e-commerce getting crowsed, Eileen Fitzpartick, New York: Jul. 17, 1999, vol. 111. Iss. 29; p. 88, downloaded from ProQestDirect on the Internet onMar. 10, 2010, 4 pages.

NPL_03 Susan J. Marks, Bill of Rights, CIO Insight, New York: Oct. 2, 2002, vol. 1, Iss. 19; p. 41, downloaded from ProQuestDirect on the Internet on Mar. 10, 2010, 9 pages.

NPL_04 Ben Wener's Pop Life Can D'Arby replace Hutchence?[Morning Edition], Orange County Register, Santa Ana, Calif.: Jun. 4, 1999, p. F. 45, downloaded from ProQuestDirect on the Internet on Mar. 10, 2010, 5 pages.

NPL_05 Stevie Nicks Promotion on VHI leads to big first week Brian Garrity, Billboard, New York; May 26, 2001, vol. 113, Iss. 21; p. 56, downloaded from ProQuest Direct on the Internet on Mar. 10, 2010. 6 pages.

NPL_06 Brad Stone, A Dream from Music, but Labels' Nightmare, NY Times, Mar. 12, 2010, downloaded from ProQuestDirect on the Internet on Mar. 14, 2010, 2 pages.

NPL_07 Format Frenzy in Digital Music; [Final Edition], Mike Musgrove, Robert Thomason, The Washington Post, Washington, D.C.: Oct. 1, 1999, p. E 01, downloaded from ProQuest Direct on the Internet on May 18, 2010, 4 pages.

NPL_08 Music gets liquid; [National Edition], Sandra Mingail, National Post, Don Mills, Ont.:Nov. 24, 1999. p. E 01, downloaded from ProQuestDirect on the Internet on Mar. 14, 2010, 4 pages.

Office Action for U.S. Appl. No. 11/247,948, mailed Mar. 16, 2010.
Office Action for U.S. Appl. No. 11/247,948, mailed May 20, 2010.
Office Action for U.S. Appl. No. 11/370,347, mailed Apr. 14, 2009.
Office Action for U.S. Appl. No. 11/370,347, mailed Nov. 17, 2009.

* cited by examiner

ON-LINE MEDIA STORE THAT SUPPORTS PRE-ORDERING OF DIGITAL MEDIA ASSETS

CROSS-REFERENCE TO RELATED APPLICATIONS

This application claims priority to U.S. Provisional Patent Application No. 60/675,731, filed Apr. 27, 2005, and entitled "ON-LINE MEDIA STORE THAT SUPPORTS PRE-ORDERING OF DIGITAL MEDIA ASSETS," which is hereby incorporated herein by reference.

This application is also related to U.S. patent application Ser. No. 10/833,267, filed Apr. 26, 2004, and entitled "METHOD AND SYSTEM FOR NETWORK-BASED PURCHASE AND DISTRIBUTION OF MEDIA," which is hereby incorporated herein by reference.

BACKGROUND OF THE INVENTION

1. Field of the Invention

The present invention relates to digital media assets and, more particularly, to advance purchase of digital media assets from an on-line media store.

2. Description of the Related Art

On-line stores, such as on-line bookstores, sometimes offer the ability to purchase a book prior to its released. Typically, this means that the user will purchase the book at that time and then, when the book is later released, the on-line bookstore will physically ship the book to the purchaser. In some cases, the on-line bookstore may have in its possession advance copies of the book that are soon to be released. In such cases, the on-line bookstore may offer purchasers early shipment of the book such that the book arrives to the purchaser on its release date. Since physical shipment is nevertheless required, inventory limitations, manpower and shipping delays can cause delays in purchasers receiving the books they have purchased.

Conventionally, music can be purchased from an on-line music store, such as the iTunes Music Server® provided by Apple Computer, Inc. Immediately following the purchase of the music from the on-line music store, it is available for electronic download by the purchaser. However, on-line music stores only offer for purchase music that artists or recording labels have released and authorized its sale on the on-line media store. Unfortunately, however, advertising of new music releases often precedes the availability of new music releases. As a result, users of on-line music stores may be desirous of purchasing music that is being advertised but not yet released. Currently, there is no way to facilitate users' desires of purchasing music at an on-line media store before it has been released. Accordingly, there is a need to facilitate purchase of new music released at an on-line media store.

SUMMARY OF THE INVENTION

The invention pertains to pre-ordering of digital media assets from an on-line media store. A user of the on-line media store can view advance listings for digital media assets that have not yet been released. A user can also choose to pre-order a digital media asset that has not yet been released. Such a pre-order is recorded and monitored so that the desired digital media asset can be purchased and delivered to the user once the digital media asset become available. Since the monitoring is computerized and the delivery is electronic, once a digital media asset becomes available, delivery of any pre-order can occur nearly immediately.

The invention can be implemented in numerous ways, including as a method, system, device, apparatus (including graphical user interface), or computer readable medium. Several embodiments of the invention are discussed below.

As a method for pre-ordering a digital media asset from an on-line media store, one embodiment of the invention includes at least the acts of: configuring the on-line media store to provide media asset content for a digital media asset in advance of the digital media asset being released; subsequently receiving a pre-order request for the digital media asset via the on-line media store; determining when the digital media asset of the pre-order request becomes available; and processing a purchase operation for the digital media asset of the pre-order request after it is determined that the digital media asset of the pre-order request becomes available.

As a computer readable medium including at least computer program code for pre-ordering a digital media asset from an on-line media store, one embodiment of the invention includes at least: computer program code for receiving, at the on-line media store, media asset content for a digital media asset in advance of the digital media assets being released; computer program code for subsequently receiving a pre-order request for the digital media asset via the on-line media store; computer program code for determining when the digital media asset of the pre-order request becomes available; and computer program code for purchasing and delivering the digital media asset of the pre-order request after said computer program code for determining determines that the digital media asset of the pre-order request has become available.

As a network-based media store server, one embodiment of the invention includes at least: means for configuring the on-line media store to provide media asset content for a digital media asset in advance of the digital media asset being released; means for receiving a pre-order request for the digital media asset via the on-line media store; means for determining when the digital media asset of the pre-order request becomes available; and means for processing a purchase operation for the digital media asset of the pre-order request after said means for determining determines that the digital media asset of the pre-order request becomes available.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to pre-ordering of digital media assets from an on-line media store. A user of the on-line media store can view advance listings for digital media assets that have not yet been released. A user can also choose to pre-order a digital media asset that has not yet been released. Such a pre-order is recorded and monitored so that the desired digital media asset can be purchased and delivered to the user once the digital media asset become available. Since the monitoring is computerized and the delivery is electronic, once a digital media asset becomes available, delivery of any pre-order can occur nearly immediately.

Embodiments of various aspects of the invention are discussed below with reference to FIGS. 1-8. However, those skilled in the art will readily appreciate that the detailed description given herein with respect to these figures is for explanatory purposes as the invention extends beyond these limited embodiments.

One aspect of the invention pertains to a system and method for pre-ordering digital media assets over a network. A potential purchaser can search and browse through numerous digital media assets that are available for pre-order or purchase. A potential purchaser can purchase a digital media asset with great ease. Upon purchasing a digital media asset, the content for the media item can be downloaded over the network to the purchaser. If a digital media asset is listed but not yet available for purchase, the digital media asset can be pre-ordered. After a digital media asset has been pre-ordered, the digital media asset can be purchased and downloaded with little or no additional effort by the purchaser.

Figure 1:
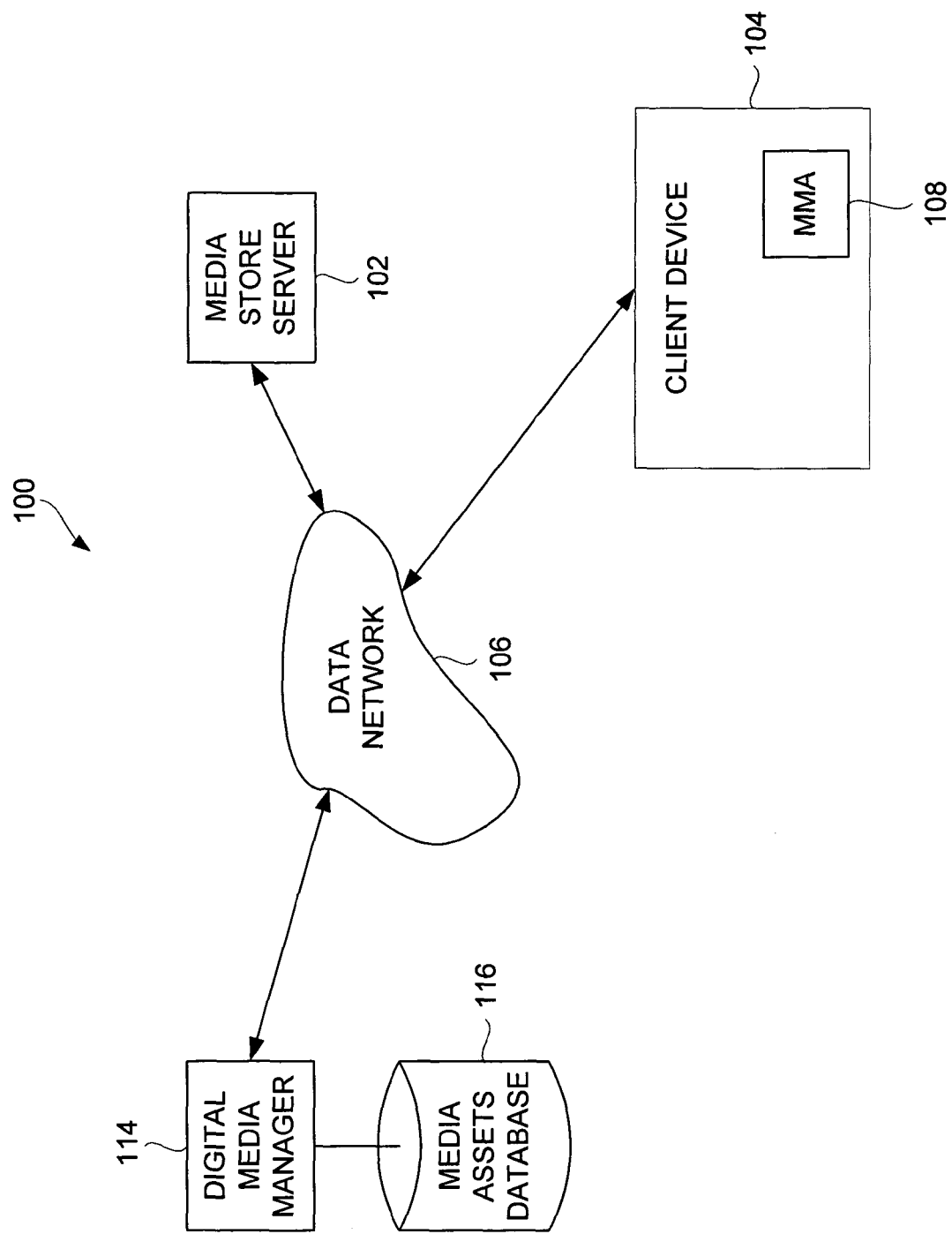
FIG. 1 is a block diagram of a media purchase system according to one embodiment of the invention.

FIG. 1 is a block diagram of a media purchase system 100 according to one embodiment of the invention. The media purchase system 100 includes a media store server 102 that hosts an on-line media store. The media store server 102 can off-load commerce transactions and/or delivery of purchased digital media assets to other servers, if desired. As shown in FIG. 1, the media purchase system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11 (a),(b) or (g) (WiFi), IEEE 802.16 (WiMax), and Ultra-Wide Band (UWB).

A computer program 108, typically a media management application (MMA) or other media player application, runs on the client device 104. One example of a media management application is the iTunes® application, produced by Apple Computer, Inc. of Cupertino, Calif. The client devices 104 are, in general, computing devices. As an example, the client devices 104 can be specific or general-purpose personal computers or portable media players. One example of a portable media player suitable for use with the invention is the iPod®, also produced by Apple Computer, Inc. The computer program 108 can be used by a consumer for a variety of purposes, including, but not limited to: (i) browsing, pre-ordering and/or purchasing media assets from the on-line media store provided by the media store server 102, (ii) creating and sharing media asset groups (e.g., playlists), (iii) organizing media assets, (iv) presenting/playing media assets, and (v) transferring media assets between client devices 104.

The media purchase system 100 also includes a digital asset manager 114. The digital asset manager 114 is coupled to a media assets database 116. The media assets database 116 stores media asset information including metadata relating to digital media assets available for purchase or pre-order at the on-line media store. In one embodiment, the digital asset manager 114 controls what media assets and media asset information are available on the on-line media store. The metadata can pertain to individual media assets (digital media assets) or media asset groups (digital media asset groups). Media assets can include, but are not limited to, music, video, text, and/or graphics files.

The media store server 102 enables the user of a particular client device 104 to purchase or pre-order media assets (e.g., songs, videos, albums) through on-line transactions. On-line transactions to purchase media items is also referred to as electronic commerce (e-commerce). Subsequently, the client device 104 can download the purchased media assets from the media store server 102, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
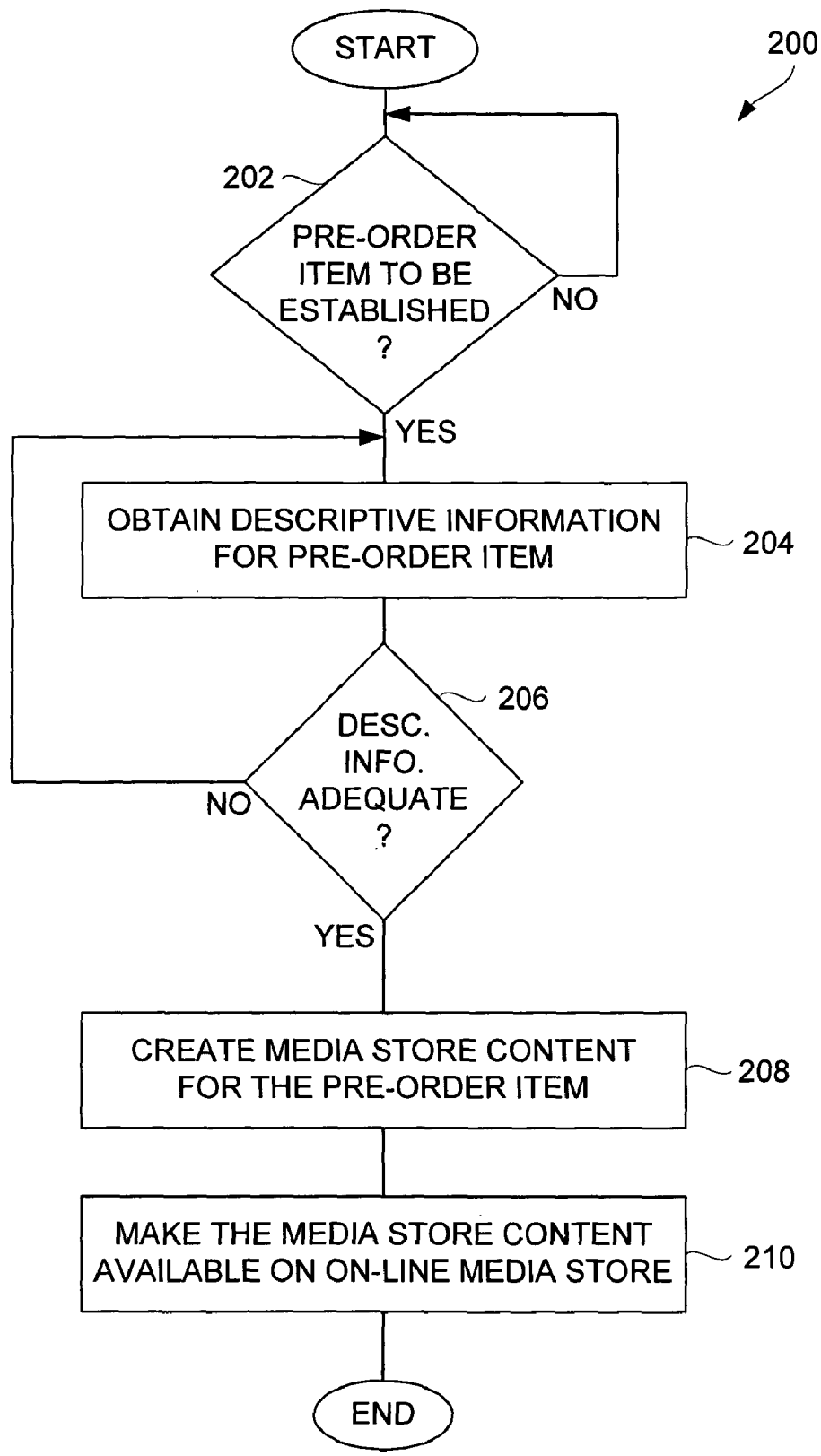
FIG. 2 is a flow diagram of a pre-order establishment process according to one embodiment of the invention.

FIG. 2 is a flow diagram of a pre-order establishment process 200 according to one embodiment of the invention. The pre-order establishment process 200 begins with a decision 202 that determines whether a pre-order item is to be established. A pre-order item is a digital media asset (digital media item) that is ordered by a user prior to its being actually available for sale (i.e., not yet released). When the decision 202 determines that a pre-order item is not to be established at this time, the pre-order establishment process 200 waits for the appropriate time. In other words, the pre-order establishment process 200 is effectively invoked when a pre-order item is to be established.

Once the decision 202 determines that a pre-order item is to be established, descriptive information for the pre-order item is obtained 204. A decision 206 then determines whether the descriptive information that has been obtained 204 is adequate. When the decision 206 determines that the descriptive information is not adequate, then the pre-order establishment process 200 returns to repeat the block 204 so that additional descriptive information can be obtained.

Once the decision 206 determines that the descriptive information that has been obtained 204 is adequate, media store content for the pre-order item is created 208. Finally, the media store content for the pre-order item is made 210 available on the on-line media store. Following the block 210, the pre-order establishment process 200 is complete and ends.

As one example, when the digital media asset pertains to one or more audio tracks (e.g., music album or audiobook), the descriptive information to be adequate should include at least title, artist or author, date of release and price (wholesale). However, the descriptive information may also include one or more of: artwork (e.g., image), label or producer, territories of storefronts where pre-order is permitted, date of release per territory or storefront, expected price (retail) per territory or storefront, universal product code, track listing, and play line information (e.g., information to be displayed while playing digital media asset).

It should also be noted that the media store content for the pre-order item that is made 210 available on the on-line media store is dependent on the descriptive information that is available and thus obtained 204. For example, if there is no artwork available, then a mock artwork or other temporary artwork can be used until the actual artwork is available. As another example, if the track listing is not available, then a fake track listing can be presented to the user. The territories/storefronts can enable the pre-order of digital media assets to be setup differently for different territories/storefronts. For example, a United States storefront (on-line media store) may offer different pre-orders (at least different prices) than does a United Kingdom storefront.

It should be noted that the media store content for the pre-order item can remain available on the on-line media store until removed or until superceded by real media store content. In other words, the media store content for the pre-ordered item represents anticipated media store content for the pre-order item. However, it is possible that the anticipated media store content is not the final media store content for the pre-order item when the item is fully available on the on-line media store. Hence, the media store content available on the on-line media store can initially be the (anticipated) media store content for the pre-order item but is eventually media store content for the actual item itself.

Figure 3:
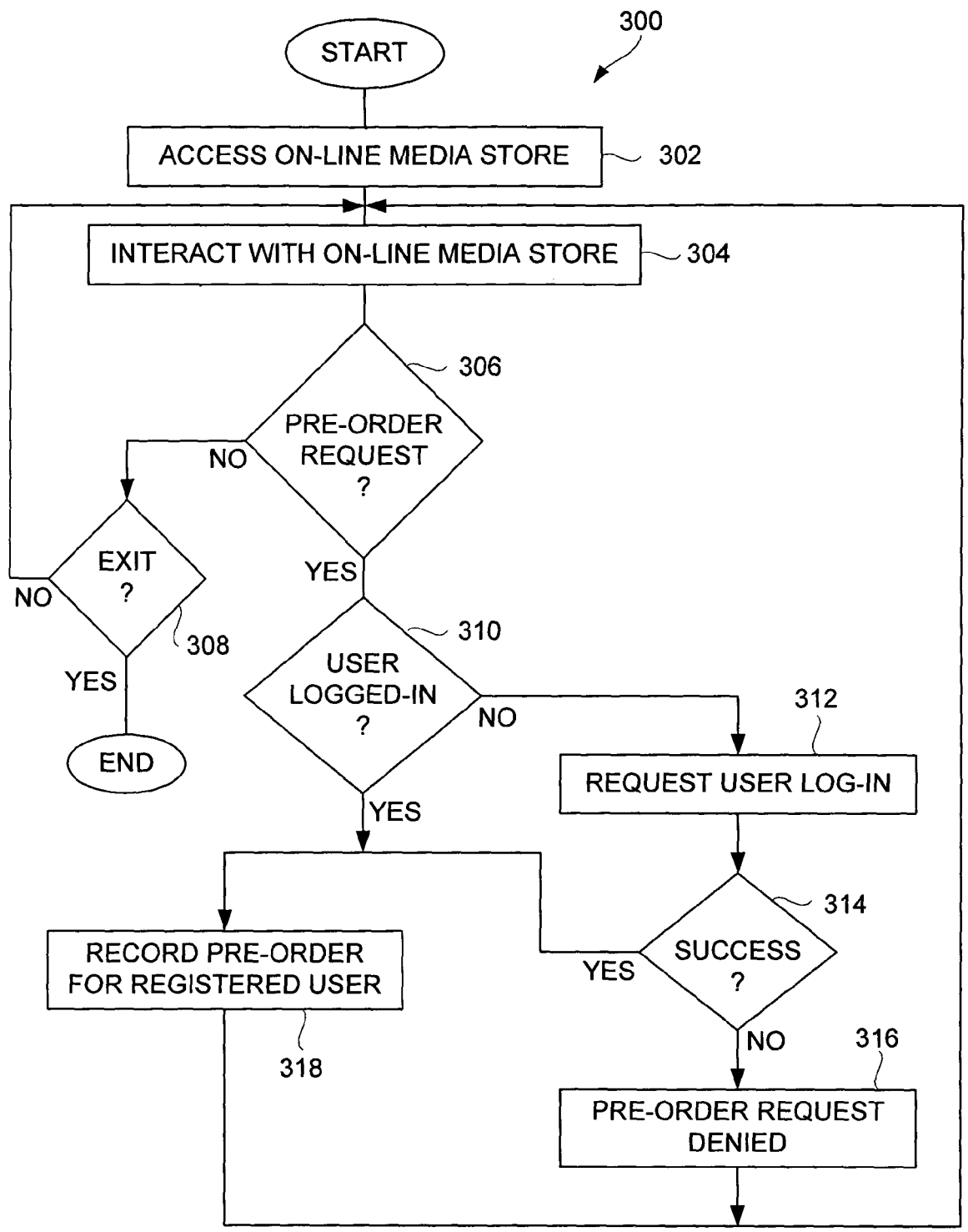
FIG. 3 is a flow diagram of a pre-order request process according to one embodiment of the invention.

FIG. 3 is a flow diagram of a pre-order request process 300 according to one embodiment of the invention. The pre-order request process 300 begins with access 302 to an on-line media store. Typically, a user will access 302 the on-line media store via a data network, such as the Internet. Once the user has accessed 302 the on-line media store, the user can interact 304 with the on-line media store. The interaction 304 with the on-line media store can, for example, involve searching, browsing, displaying, previewing, purchasing, pre-ordering, and/or organizing digital media assets. The access 302 and the interaction 304 can be facilitated by a media management application operating on a client machine, such as the client machine 104 illustrated in FIG. 1.

Next, a decision 306 determines whether a pre-order request has been received. When the decision 306 determines that a pre-order request has not been received, a decision 308 determines whether the pre-order request process 300 should be exited. When the decision 308 determines that the pre-order request process 300 should not be exited, then the pre-order request process 300 returns to repeat the operation 304 and subsequent operations. In one embodiment, when media store content for a pre-ordered item is displayed by the on-line media store, a "pre-order" control (e.g., button) is presented to the user. By selection of the "pre-order" control, the user can initiate a pre-order request. Alternatively, when the decision 306 determines that the pre-order request process 300 should exit, then the pre-order request process 300 ends.

On the other hand, when the decision 306 determines that a pre-order request has been received, then a decision 310 determines whether the user is logged-in to the on-line media store. When the decision 310 determines that the user is not currently logged-in to the on-line media store, a user login is requested 312. A decision 314 then determines whether the login has been successful. As an example, the user will submit login information, such as a user name and/or password, which is evaluated to determine whether the user is permitted to login. When the decision 314 determines that login was not successful, the pre-order request is denied 316. Alternatively, when the decision 310 determines that the user is already logged-in, or when the decision 314 determines that the user has just successfully logged-in, the pre-order for a particular digital media asset is recorded 318 for the registered user. For example, the pre-order can be recorded such that it is associated with the registered user (e.g., associated with the user account for the registered user). Following the operation 316 or 318, the pre-order request process 300 returns to repeat the operation 304 and subsequent operations so that additional interaction 304 with the on-line media store is permitted, including making additional pre-order requests if so desired.

Figure 4:
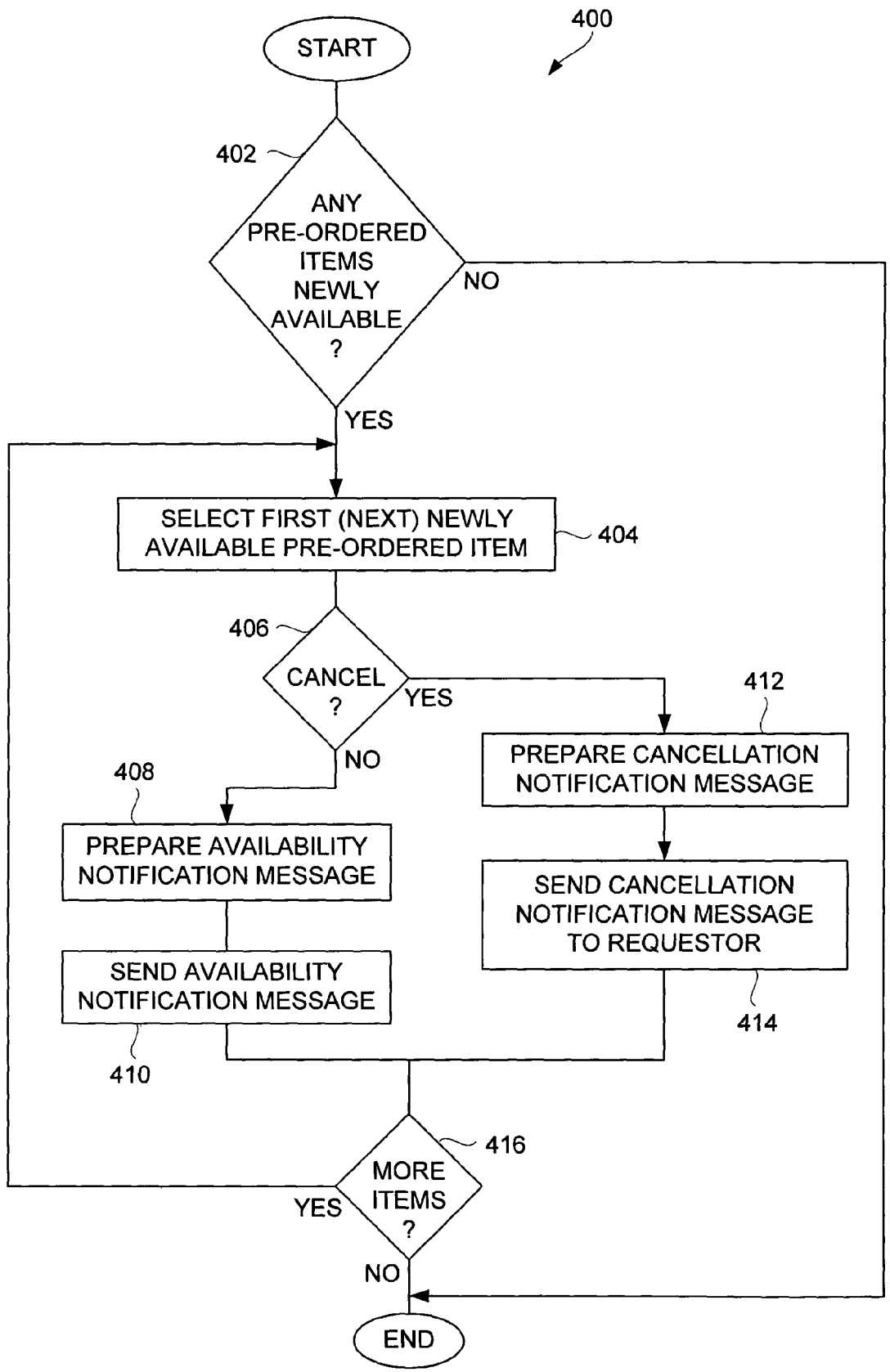
FIG. 4 is a flow diagram of a pre-order notification process according to one embodiment of the invention.

FIG. 4 is a flow diagram of a pre-order notification process 400 according to one embodiment of the invention. The pre-order notification process 400 begins with a decision 402. The decision 402 determines whether any pre-ordered items are newly available. Here, the decision 402 determines whether any pre-ordered items have recently been made available on the on-line media store such that they can be now purchased and delivered to requesting users. However, in one embodiment, to be available, the pre-ordered items need to be not only physically available to the on-line media store but also the release date for such digital media assets must not be in the future.

When the decision 402 determines that there are pre-ordered items that are newly available, the pre-order notification process 400 performs processing operations for each of the pre-ordered items that are now newly available. In particular, a first newly available pre-ordered item is selected 404. A decision 406 then determines whether the pre-ordered item needs to be canceled. When the decision 406 determines that the pre-ordered item needs to be canceled, a cancellation notification message is prepared 412. The cancellation notification message is then sent 414 to a requester. Here, the requester is the user that initially pre-ordered the item (i.e., digital media asset). For example, a pre-order item might be cancelled if the price of the actual item changed from its pre-order price, or if it turns out that the actual item will not be available from the on-line store from which it was ordered. Alternatively, when the decision 406 determines that the pre-ordered item does not need to be canceled, an availability notification message is prepared 408. Then, the availability notification message is sent 410. As an example, the cancellation notification message and the availability notification message can be implemented as electronic mail (email) messages.

Following the operation 410 as well as the operation 414, the pre-order notification process 400 determines at decision 416 whether more pre-ordered items are to be processed. In other words, when the decision 416 determines that there are other newly available pre-ordered items to be processed, the pre-order notification process 400 returns to repeat the operation 404 so that a next newly available pre-ordered item can be similarly processed. Alternatively, when the decision 416 determines that there are no more other newly available pre-ordered items to be processed, the pre-order notification process 400 is complete and ends.

Figure 5:
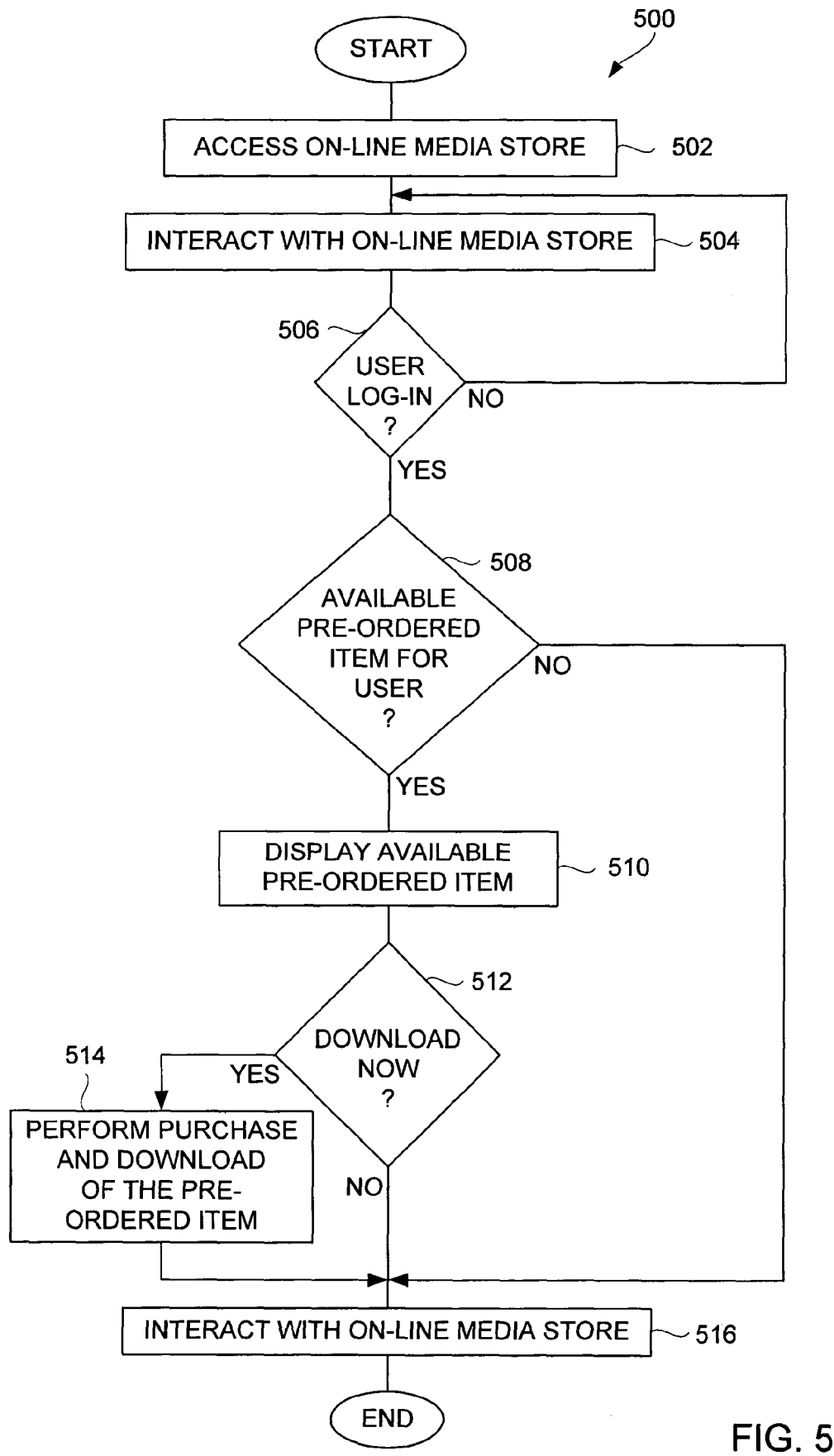
FIG. 5 is a flow diagram of a pre-order delivery process according to one embodiment of the invention.

FIG. 5 is a flow diagram of a pre-order delivery process 500 according to one embodiment of the invention. The pre-order delivery processed 500 concerns the eventual purchase and delivery of a pre-ordered item to its requesting user.

The pre-order delivery process 500 initially involves access 502 to an on-line media store. Typically, a user gains access 502 to the on-line media store via a data network, such as the Internet. After the user has access 502 to the on-line media store, the user can interact 504 with the on-line store. Certain interactions with the on-line media store, such as purchasing, pre-ordering and downloading, require that the user be a registered user. In this regard, the on-line media store requires that a user login to authenticate that the user is indeed a registered user of the on-line media store. Hence, when the interaction 504 requires such login, a decision 506 determines whether the user has successfully logged in to the on-line media store. When the decision 506 determines that the user has not yet logged-in, then the pre-order delivery process 500 returns to repeat the operation 504 for other interaction with the on-line media store.

On the other hand, when the decision 506 determines that the user has successfully logged-in, a decision 508 determines whether there are any available pre-ordered items for the user. When the decision 508 determines that there are one or more available pre-ordered items for the user, the available pre-ordered items are displayed 510 for the user. For example, a dialog box can be presented on a display screen that the user is able to view. The dialog box can allow the user to initiate download of the one or more available pre-ordered items.

Thereafter, a decision 512 determines whether the user desires to download the one or more available pre-ordered items at this time. When the decision 512 determines that the user does desired to download one or more of the available pre-ordered items, purchase and download of one or more of the available pre-ordered items is performed 514. Alternatively, when the decision 512 determines that none of the available pre-ordered items are to be downloaded, the operation 514 is bypassed. In this case, the user chooses to either defer the download or cancel the pre-order. Following the decision 512 when download is not performed, or following the operation 514 following purchase and download, additional interaction 516 with the on-line media store can be provided for the user. Additionally, following the decision 508 when there are no available pre-ordered items for the user, the pre-order delivery process 500 bypasses the operations 510-514 and proceeds to permit the additional interaction 516 with the on-line media store. Eventually, when no further interaction 516 with the on-line media store is desired, the pre-order delivery process 500 ends.

Additionally, a pre-order management page can be made available to a user. The pre-order management page can allow the user to cancel or otherwise manage any of the pre-orders that they may have made. For example, the pre-order management page could display a list of pending pre-orders that are associated with the user (e.g., associated with a user's account with the on-line media store). Then, through interaction with the pre-order management page, the user can cancel one or more of the pre-orders. The user might also be also to check the status of the pre-orders. Once one of the pre-orders is fulfilled (e.g., purchased and downloaded), the pre-order is removed from the list of pending pre-orders and, if desired, added to a purchase history page that is also available to the user.

Figure 6:
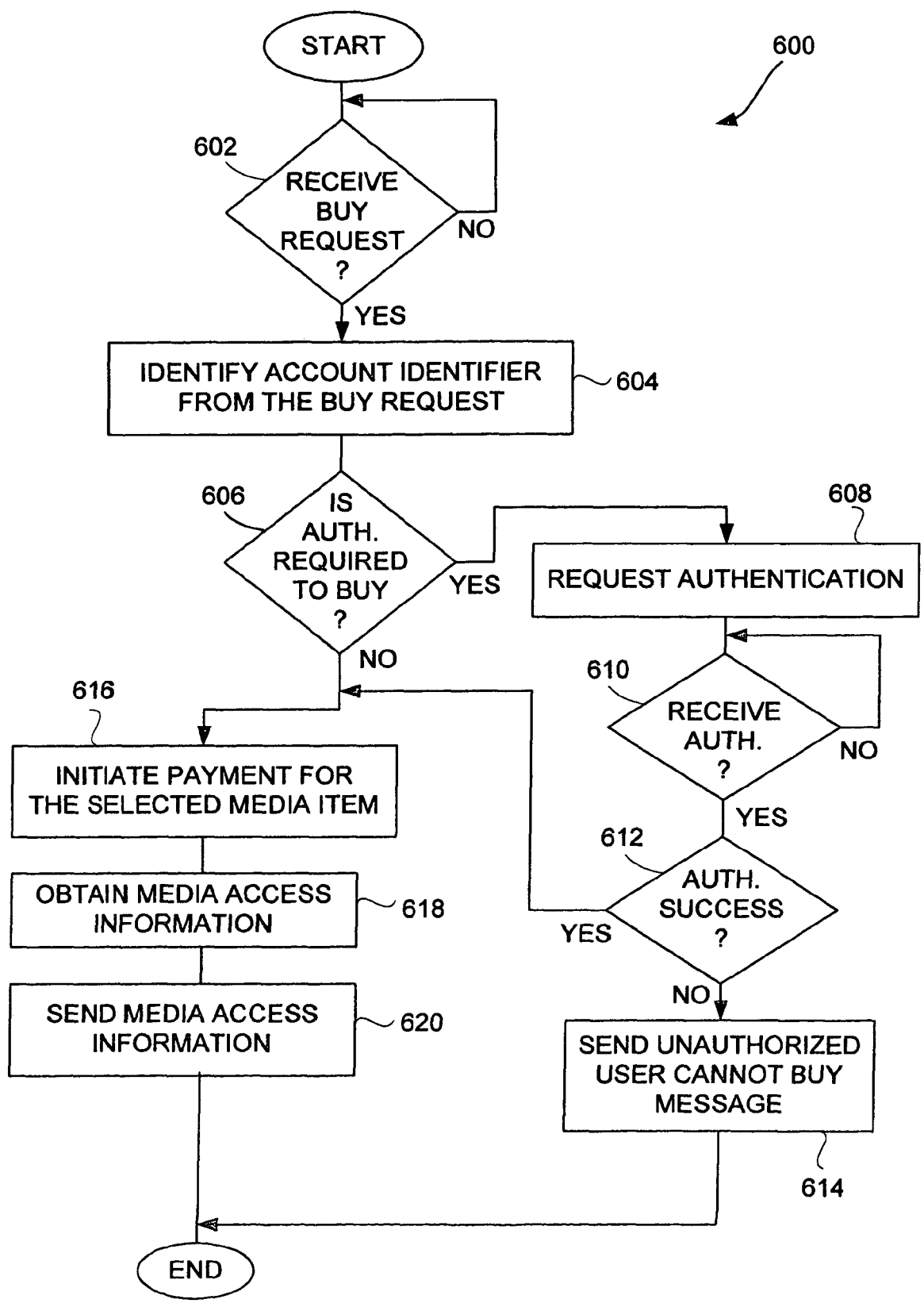
FIG. 6 is flow diagram of media commerce processing according to one embodiment of the invention.

FIG. 6 is flow diagram of media commerce processing 600 according to one embodiment of the invention. The media commerce processing 600 is, for example, performed by a media store server, such as the media store server 102 illustrated in FIG. 1, which can not only provide an on-line media store but also a media commerce server. Alternatively, the media commerce processing 600 could be performed by a dedicated media commerce server.

The media commerce processing 600 begins with a decision 602 that determines whether a buy request has been received. When the decision 602 determines that a buy request has not yet been received, the media commerce processing 600 awaits such a request. A buy request can be as a result of a real-time purchase of a digital media asset from an on-line media store or as the result of a deferred purchase (e.g., due to a pre-order) of a digital media asset from the on-line media store. On the other hand, once the decision 602 determines that a buy request has been received, the media commerce processing 600 proceeds to process the buy request. In this regard, an account identifier is identified 604 from the buy request. Here, the buy request is sent by a client device to the media commerce server on behalf of a user of the client device (namely, a user of a media player application operating on the client device). In one embodiment, the buy request that is sent to the media commerce server includes not only an account identifier for the user of the client but also at least one media item identifier, media price, and a password token. The password token is a random value (e.g., 128 bit string) that is different for every user. The media storage server provides the password token to the client as a result of successful authentication of the user. When the buy request includes a valid password token, the media commerce server can deem the client as properly authenticated.

Next, a decision 606 determines whether authentication is required prior to purchase of the media items. When the decision 606 determines that authentication is required, additional processing can be performed to determine whether such authentication exists. In one embodiment, the user's account or client can configure whether such authentication is required or can be overridden by the user. In one embodiment, the authentication is provided to help protect the user of the client device (e.g., media player) from other unauthorized users who might access the media commerce server from the client device after the user has successfully been authenticated to the media commerce server. The re-authentication is thus used to confirm that the particular user of the client device (e.g., media player) is indeed the authorized user for such a system. In this regard, authentication is requested 608. Then, a decision 610 determines whether an authentication response has been received. Once the decision 610 receives the authentication response, a decision 612 determines whether the authentication response is able to successfully authenticate the user. When the decision 612 determines that authentication has not been successful, a message indicating that an unauthorized user cannot buy media items is sent 614 to the client for display to the user.

On the other hand, when the decision 612 determines that authentication has been successful, then additional processing is performed to facilitate the purchase of the selected media item identified in the buy request. In this regard, payment for the selected media item is initiated 616. Here, according to one embodiment, the payment can be made by a credit card, and the initiation of such payment can verify the credit card's existence, but may or may not seek to post the charge at this time. It may be more efficient and desirable to defer the actual posting of the credit to the credit card until a later time. Nevertheless, after the payment for the selected media item has been initiated 616, media access information is obtained 618. The media access information is information that will enable the client (e.g., media management application) to retrieve and then access the media content for the selected media item. The media access information, in one embodiment, includes a URL, a download key, and a security token. Next, the media access information is sent 620. Here, the media access information is sent from the media commerce server to the client device, namely, the media management application operating on the client device. At this point, the transaction is not fully completed because the media content for the selected media item has not yet been received by the client device. Following the operations 614 and 622, the media commerce processing 600 is complete and ends.

Additionally, before processing a buy request for a real-time purchase of a particular digital media asset, the media commerce processing 600 can determine if there is an existing pre-order for the particular digital media asset. If there is an existing pre-order it has likely already been purchased given that the particular digital media asset is now available for real-time purchase. However, the user may have not yet downloaded the particular digital media asset from the on-line media store. Hence, a dialog box can be displayed to inform the user that the particular digital media asset whose purchase is attempted has already been purchased but perhaps not yet downloaded.

Figure 7:
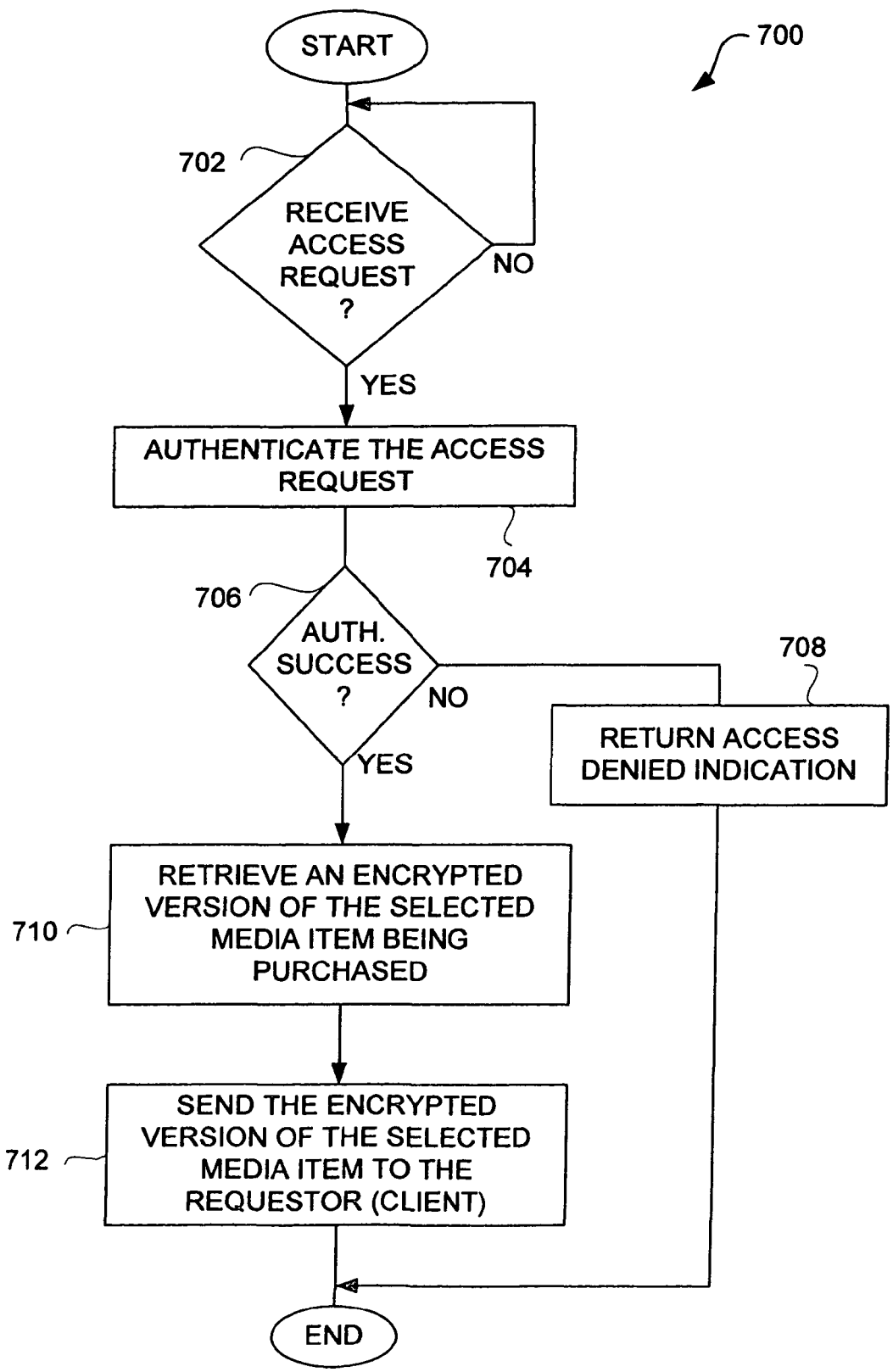
FIG. 7 is a flow diagram of media delivery processing according to one embodiment of the invention.

FIG. 7 is a flow diagram of media delivery processing 700 according to one embodiment of the invention. The media delivery processing 700 is, for example, performed by the media store server 102 illustrated in FIG. 1, which can not only provide an on-line media store but also a media storage server that stores and manages delivery of digital media assets. Alternatively, the media delivery processing 700 can be performed by a dedicated media storage server.

The media delivery processing 700 begins with a decision 702. The decision 702 determines whether an access request has been received. An access request is a request from a client device to obtain the media content for one or more media items that are stored in a media store associated with the media storage server. In one embodiment, the access request includes at least a URL for the selected media item and a security token from the client device. When the decision 702 determines that an access request has been received, then the media delivery processing 700 is effectively invoked. In other words, once an access request has been received, the access request is authenticated 704. The authentication 704 involves the analysis of at least a portion of the access request to authenticate that the request is legitimate and from one that was authorized by the media commerce server. In one embodiment, a hash algorithm can be applied to the URL, a name of the media commerce server, and a time of purchase. The result of the hash algorithm is then compared with the security token which is the product of a complimentary hash algorithm performed at the media commerce server. A decision 706 then determines whether the authentication was successful. Here, in one embodiment, if the hashing algorithm approach is used, the result of the hash algorithm should match the security token within some tolerance set by a time limitation. For example, the tolerance due to time might permit the access request to remain authenticated for forty-eight (48) hours after purchase.

When the decision 706 determines that the authentication was not successful, then an access denied indication is returned 708. Here, the access request is denied and the client device is so notified. On the other hand, when the decision 706 determines that the authentication was successful, then an encrypted version of the selected media item that has been purchased is retrieved 710. Here, the media storage server would retrieve the encrypted version of the selected media item from a media storage device. Then, the encrypted version of the selected media item is sent 712 to the client device (requestor). In other words, the encrypted version of the selected media item is downloaded to the client device that has requested the selected media item. Following the operations 708 and 712, the media delivery processing 700 is complete and ends.

Figure 8:
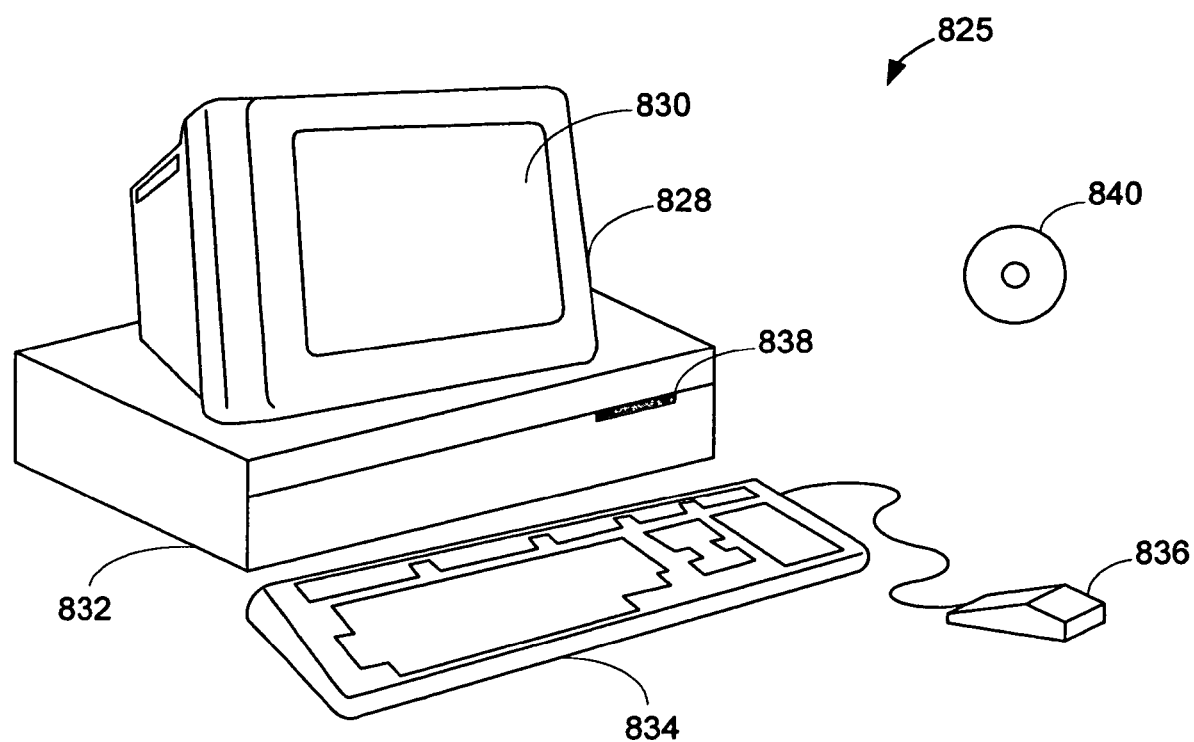
FIG. 8 shows an exemplary computer system suitable for use with the invention.

FIG. 8 shows an exemplary computer system 825 suitable for use with the invention. Computer system 825 includes a display monitor 828 having a single or multi-screen display 830 (or multiple displays), cabinet 832, keyboard 834, and mouse 836. Cabinet 832 houses a drive 838, such as a CD-ROM or floppy drive, system memory and a hard drive (not shown) which may be utilized to store and retrieve software programs incorporating computer code that implements some or all aspects of the invention, data for use with the invention, and the like. Although CD-ROM 840 is shown as an exemplary computer readable storage medium, other computer readable storage media including floppy disk, tape, flash memory, system memory, and hard drive may be utilized. In one implementation, a software program for the computer system 825 is provided in the system memory, the hard drive, the CD-ROM 840 or other computer readable storage medium and serves to incorporate the computer code that implements some or all aspects of the invention.

The digital media assets (i.e., digital media items) can pertain to audio items (e.g., audio files or audio tracks, such as for songs (music) or audiobooks), video items (e.g., video files or movies), or image items (e.g., photos). The digital media assets can also include booklets, e.g., portable document format (PDF) files.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that pre-orders for digital media assets can be permitted by an on-line media store. Another advantage of the invention is that eventual delivery of the previously pre-ordered digital media assets can be performed electronically and nearly immediately once pre-ordered digital media assets become available. Still another advantage of the invention is that digital media assets can be posted at an on-line media store in advance of their release with only little descriptive information required. Yet still another advantage of the invention is that pre-orders for digital media assets can be managed via an on-line media store.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for ordering a digital media asset from an on-line media store prior to the digital media asset being released, the on-line media store being hosted by a media store server, said method comprising:
    (a) configuring the on-line media store to provide media content for the digital media asset in advance of the digital media asset being released;
    (b) subsequently receiving a pre-order request for the digital media asset via the on-line media store;
    (c) subsequently determining, at the media store server, when the digital media asset of the pre-order request is released;

(d) determining whether the pre-order request has been cancelled; and (e) processing a purchase operation for the digital media asset of the pre-order request after said determining (c) determines that the digital media asset of the pre-order request has been released so long as the pre-order request has not been cancelled.

2. The method of claim 1, wherein said processing (e) comprises:

(e1) processing electronic payment for the purchase of the digital media asset of the pre-order request after said determining (c) determines that the digital media asset of the pre-order request has been released; and (e2) thereafter electronically delivering the digital media asset of the pre-order request.

3. The method of claim 1, wherein said processing (e) comprises:

(e1) electronically delivering the digital media asset of the pre-order request after said determining (c) determines that the digital media asset of the pre-order request has been released; and (e2) thereafter processing electronic payment for the purchase of the digital media asset of the pre-order request.

4. The method of claim 1, wherein said processing (e) comprises:

(e1) processing electronic payment for the purchase of the digital media asset of the pre-order request after said determining (c) determines that the digital media asset of the pre-order request has been released; and (e2) electronically delivering the digital media asset of the pre-order request after said determining (c) determines that the digital media asset of the pre-order request has been released.

5. The method of claim 1, wherein the pre-order request is from a requestor, and wherein, after said determining (c) determines that the digital media asset of the pre-order request been released, said processing (e) comprises:

(e1) confirming with the requestor that the digital media asset of the pre-order request is to be purchased;

(e2) processing electronic payment for the purchase of the digital media asset of the pre-order request after said confirming (e1) confirms that the digital media asset of the pre-order request is to be purchased; and (e3) electronically delivering the digital media asset of the pre-order request after said confirming (e1) confirms that the digital media asset of the pre-order request is to be purchased.

6. The method of claim 1, wherein the pre-order request is from a requestor, and wherein said method further comprises storing pre-order data for the pre-order request, the pre-order data being stored in association with the requestor.

7. The method of claim 6, wherein said processing (e) is performed when the requestor logs in to the on-line media store after the digital media asset of the pre-order request has been released.

8. The method of claim 6, wherein said processing (e) comprises sending a notification message to the requestor to inform the requestor of the availability of the digital media asset of the pre-order request.

9. The method of claim 6, wherein said processing (e) comprises sending a notification message to the requestor to inform the requestor of the availability of the digital media asset of the pre-order request and to invite the requestor to access the on-line media store to electronically acquire the digital media asset.

10. The method of claim 6, wherein said processing (e) comprises sending a cancellation message to the requestor to inform the requestor of the cancellation of the pre-order request.

11. The method of claim 1, wherein said configuring (a) provides a release date for each of a plurality of different territories or storefronts, wherein the pre-order request being received for the digital media asset via the on-line media store is associated with a particular territory or storefront, and wherein said determining (c) determines when the digital media asset of the pre-order request is released based on the release date for the particular territory or storefront associated with the pre-order request.

12. A computer readable medium including at least computer program code for ordering a digital media asset from an on-line media store prior to the release of the digital media asset, said computer readable medium comprising:

computer program code for receiving, at the on-line media store, media content for the digital media asset in advance of the digital media assets being released;

computer program code for subsequently receiving a pre-order request for the digital media asset via the on-line media store;

computer program code for determining when the digital media asset of the pre-order request is released;

computer program code for determining whether the pre-order request has been cancelled: and computer program code for purchasing and delivering the digital media asset of the pre-order request after said computer program code for determining determines that the digital media asset of the pre-order request has been released so long as the pre-order request has not been cancelled.

13. The computer readable medium as recited in claim 12, wherein said computer program code for purchasing and delivering comprises:

computer program code for processing electronic payment for the purchase of the digital media asset of the pre-order request after it is determined that the digital media asset of the pre-order request has become available; and computer program code for electronically delivering the digital media asset of the pre-order request after it is determined that the digital media asset of the pre-order request has become available.

14. The computer readable medium as recited in claim 13, wherein said computer program code for processing sends a notification message to a requestor to inform the requestor of the availability of the digital media asset of the pre-order request.

15. The computer readable medium as recited in claim 12, wherein said computer readable medium further comprises: computer program code for cancelling the pre-order request for the digital media asset of the pre-order.

16. The computer readable medium as recited in claim 15, wherein said computer readable medium further comprises: computer program code for sending a cancellation message to a requestor informing the requestor of the cancellation of the pre-order request.

17. The computer readable medium as recited in claim 12, wherein said computer readable medium further comprises: computer program code for providing a pre-order management page.

18. The computer readable medium as recited in claim 12, wherein said computer readable medium further comprises: computer program code for assisting an administrator in providing the media content for the digital media asset to the on-line media store in advance of the digital media assets being released.

19. The computer readable medium as recited in claim 12,
    wherein said computer program code for configuring provides a release date for each of a plurality of different territories or storefronts,
    wherein the pre-order request being received for the digital media asset via the on-line media store is associated with a particular territory or storefront, and
    wherein said computer program code for determining determines when the digital media asset of the pre-order request is released based on the release date for the particular territory or storefront associated with the pre-order request.

20. A network-based media store server, said server comprising:
    a memory for storage of computer program code; and
    a processor configured to execute or perform the computer program code,
    wherein the computer program code includes at least:
        computer program code for configuring the on-line media store to provide media content for a digital media asset in advance of the digital media asset being released;
        computer program code for receiving a pre-order request for the digital media asset via the on-line media store, the pre-order request being a request to order the digital media asset from the on-line media store prior to the digital media asset being released;
        computer program code for determining when the digital media asset of the pre-order request is released;
        computer program code for determining whether the pre-order request has been cancelled; and
        computer program code for processing a purchase operation for the digital media asset of the pre-order request after said means for determining determines that the digital media asset of the pre-order request has been released so long as the pre-order request has not been cancelled.

* * * * *

UNITED STATES PATENT AND TRADEMARK OFFICE
CERTIFICATE OF CORRECTION

| | | |
|---|---|---|
| PATENT NO. | : 7,848,954 B2 | Page 1 of 1 |
| APPLICATION NO. | : 11/212314 | |
| DATED | : December 7, 2010 | |
| INVENTOR(S) | : Bruno Posokhow et al. | |

It is certified that error appears in the above-identified patent and that said Letters Patent is hereby corrected as shown below:

On page 2, in column 1, under "Other Publications", line 15, delete "Fitzpartick," and insert -- Fitzpatrick, --, therefor.

On page 2, in column 1, under "Other Publications", line 16, delete "ProQestDirect" and insert -- ProQuestDirect --, therefor.

On page 2, in column 1, under "Other Publications", line 16, delete "onMar." and insert -- on Mar. --, therefor.

In column 12, line 29, in claim 12, delete "cancelled:" and insert -- cancelled; --, therefor.

Signed and Sealed this
Twenty-fifth Day of October, 2011

David J. Kappos
*Director of the United States Patent and Trademark Office*